(12) United States Patent
Aiba

(10) Patent No.: US 11,546,009 B2
(45) Date of Patent: Jan. 3, 2023

(54) MOVING BODY-MOUNTED COMMUNICATION SYSTEM AND COMMUNICATION SYSTEM

(71) Applicant: Yazaki Corporation, Tokyo (JP)

(72) Inventor: Takamitsu Aiba, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 36 days.

(21) Appl. No.: 17/402,757

(22) Filed: Aug. 16, 2021

(65) Prior Publication Data
US 2022/0060205 A1 Feb. 24, 2022

(30) Foreign Application Priority Data

Aug. 18, 2020 (JP) .............................. JP2020-137793

(51) Int. Cl.
*H04B 1/3822* (2015.01)
*H04B 10/2575* (2013.01)

(52) U.S. Cl.
CPC ..... *H04B 1/3822* (2013.01); *H04B 10/25759* (2013.01)

(58) Field of Classification Search
CPC ........ H04B 10/40; H04B 10/807; H04B 3/56; H04B 10/116; H04B 3/542; H04B 10/25; H04B 10/25891; H04B 10/0795; H04B 10/2589; H04B 10/564; H04B 2203/5441; H04B 2203/5479; H04B 2203/5483; H04B 3/58; H04B 10/1123; H04B 10/079; H04B 10/118; H04B 10/25753; H04B 2203/5404; H04B 3/46; H04B 3/52; H04B 3/54; H04B 10/032; H04B 10/07955; H04B 10/11; H04B 10/112; H04B 10/1143; H04B 10/2575; H04W 4/40; H04W 4/44; H04W 4/46; H04W 4/02; H04W 4/024; H04W 72/02; H04W 16/26; H04W 4/80; H04W 72/0453; H04W 84/12; H04W 88/085; H04W 88/10; H04W 24/02; H04W 24/08;
(Continued)

(56) References Cited

U.S. PATENT DOCUMENTS

2009/0306841 A1 12/2009 Miwa et al.
2020/0106481 A1* 4/2020 Mitchell .................. H04B 3/56

FOREIGN PATENT DOCUMENTS

JP 2008-285075 A 11/2008
JP 2014-113952 A 6/2014

* cited by examiner

*Primary Examiner* — Golam Sorowar
(74) *Attorney, Agent, or Firm* — Sughrue Mion, PLLC

(57) ABSTRACT

A moving body-mounted communication system includes an internal connector, a third transmission line and a first information transmitting and receiving device. The internal connector is mounted in a moving body and connected to an external connector which is connected to a second transmission line. The third transmission line is arranged in the moving body and connected to the internal connector. The first information transmitting and receiving device is connected to the third transmission line. Information is transferred between a first transmission line used in an information and communication network outside the moving body and the second transmission line, and is transferred between the second transmission line and the third transmission line, without performing conversion of the information form of the information between light and electricity.

9 Claims, 7 Drawing Sheets

(58) Field of Classification Search
CPC ....... H04W 24/10; H04W 4/027; H04W 4/06; H04W 4/38; H04W 52/146; H04W 52/247; H04W 52/28; H04W 52/281; H04W 52/283; H04W 52/286; H04W 52/36; H04W 52/38; H04W 52/383; H04W 64/003; H04W 72/0473
See application file for complete search history.

MOVING BODY-MOUNTED COMMUNICATION SYSTEM AND COMMUNICATION SYSTEM

CROSS-REFERENCE TO RELATED APPLICATIONS

The present application is based on, and claims priority from Japanese Patent Application No. 2020-137793, filed on Aug. 18, 2020, the entire contents of which are incorporated herein by reference.

TECHNICAL FIELD

The disclosure relates to a moving body-mounted communication system and a communication system.

BACKGROUND

Conventionally, communication networks have been constructed to process a large amount of data information such as sensor information and entertainment information, in moving bodies such as vehicles, ships, and aircraft. In recent years, it has been considered to aggregate this large amount of data information into a system such as cloud computing, and to provide new services using the aggregated large amount of data information. However, in order to aggregate such a large amount of data information into an external system such as cloud computing, it is necessary to perform relay processing such as protocol conversion, modulation and demodulation processing, and signal conversion in the conventional technology. In addition, when an update program is provided from an external system to a moving body in order to provide a new service, it is also necessary to perform the relay processing described above.

For example, Patent Document 1 (JP 2014-113952A) discloses an in-vehicle system in which networks to each of which one or more electronic control devices are connected are hierarchically connected via a relay device such as a gateway. The in-vehicle system includes a structure reproducing means for reproducing a network structure based on the list of electronic control devices associated with the relay device. The in-vehicle system further includes a communication path determining means for determining a communication path via which an update program can be transmitted from a first electronic control unit to a second electronic control unit, based on communication path determining information and the network structure. The in-vehicle system furthermore includes a structure to transmit the update program to a target device via the communication path. In this case, the update program may be transmitted through a plurality of relay devices such as gateways.

SUMMARY

The in-vehicle system disclosed in Patent Document 1 has a relay device that includes a configuration with modulation and demodulation in the middle in its connection configuration with the infrastructure. Due to this, there is a case where the in-vehicle system is not appropriate for downloading and uploading a large amount of data in a short period of time. In other words, there is a possibility that the in-vehicle system disclosed in Patent Document 1 causes delays in communication time. In addition, when optical communication is applied to the in-vehicle system disclosed in Patent Document 1, the relay device needs to be configured to convert optical signals into electrical signals and then convert the electrical signals into optical signals again. Furthermore, in the in-vehicle system disclosed in Patent Document 1, if protocol conversion is required in the relay device, there is a case where low latency transmission becomes even more difficult.

The disclosure has been made in view of such a conventional problem, and it is an object of the disclosure to provide a moving body-mounted communication system and a communication system that can transmit a large amount of data at a higher speed than before, using communication in which a converter with protocol conversion or media conversion is not used between a moving body-mounted communication network and the outside thereof.

According to an embodiment, there is provided a moving body-mounted communication system including: an internal connector mounted on a moving body and connected to an external connector which is connected to a second transmission line, wherein information is transferred in a first transmission line used in an information and communication network outside the moving body, and the information is transferred between the first transmission line and the second transmission line without performing conversion of an information form of the information between light and electricity; a third transmission line arranged in the moving body and connected to the internal connector, wherein the information is transferred between the second transmission line and the third transmission line without performing conversion of the information form of the information between light and electricity; and a first information transmitting and receiving device connected to the third transmission line, and transmitting and receiving the information transferred in the third transmission line, wherein the first information transmitting and receiving device transmits the information to the information and communication network and receives the information from the information and communication network, without performing conversion of the information form of the information between light and electricity, and the internal connector is connected to the second transmission line and an energy supply transmission line by which energy for moving the moving body is supplied.

According to an embodiment, the first information transmitting and receiving device transmits the information to the information and communication network and receives the information from the information and communication network, without performing at least one of a modulation process and a demodulation process of the information form.

According to an embodiment, each of the first transmission line, the second transmission line and the third transmission line is an optical fiber, and the information form is an optical signal.

According to an embodiment, a single-mode optical fiber is used in a part of the first transmission line connected to the second transmission line, and each of the second transmission line and the third transmission line is a single-mode optical fiber or a multimode optical fiber.

According to an embodiment, the internal connector is connected to a plurality of third transmission lines, and one of the third transmission lines connected to the internal connector is connected to one first information transmitting and receiving device.

According to an embodiment, the internal connector is connected to the third transmission line via an optical branching device, and the third transmission line connected to the optical branching device is directly connected to the first information transmitting and receiving device or is connected to the first information transmitting and receiving device via another optical branching device.

According to an embodiment, there is provided the moving body-mounted communication system further including a second information transmitting and receiving device connected to the first information transmitting and receiving device via an optical fiber or a metal cable, wherein the first information transmitting and receiving device includes a data buffer section for communication with the second information transmitting and receiving device when a communication speed between the first information transmitting and receiving device and the second information transmitting and receiving device is lower than a communication speed between the first information transmitting and receiving device and the third transmission line.

According to an embodiment, there is provided a communication system including: a moving body-mounted communication system including an internal connector mounted on a moving body; an external connector connected to the internal connector; and a hybrid cable connected to the external connector and including therein a second transmission line and an energy supply transmission line by which energy for moving the moving body is supplied, wherein the moving body-mounted communication system further including: a third transmission line arranged in the moving body and connected to the internal connector, and a first information transmitting and receiving device connected to the third transmission line, and transmitting and receiving the information transferred in the third transmission line, information is transferred in a first transmission line used in an information and communication network outside the moving body, the information is transferred between the first transmission line and the second transmission line without performing conversion of an information form of the information between light and electricity, the information is transferred between the second transmission line and the third transmission line without performing conversion of the information form of the information between light and electricity, and the first information transmitting and receiving device transmits the information to the information and communication network and receives the information from the information and communication network, without performing conversion of the information form of the information between light and electricity.

According to an embodiment, there is provided the communication system further including: an energy supply facility supplying energy to the energy supply transmission line, wherein the energy supply facility includes a connection portion which connects the first transmission line to the second transmission line, and the connection portion includes an optical amplifier.

According to an embodiment, the moving body uses electric power as energy, and the energy supply transmission line is a power cable.

According to the embodiment, a moving body-mounted communication system and a communication system can transmit a large amount of data at a higher speed than before, using communication in which a converter with protocol conversion or media conversion is not used between the moving body-mounted communication network and the outside thereof.

DETAILED DESCRIPTION

Figure 1:
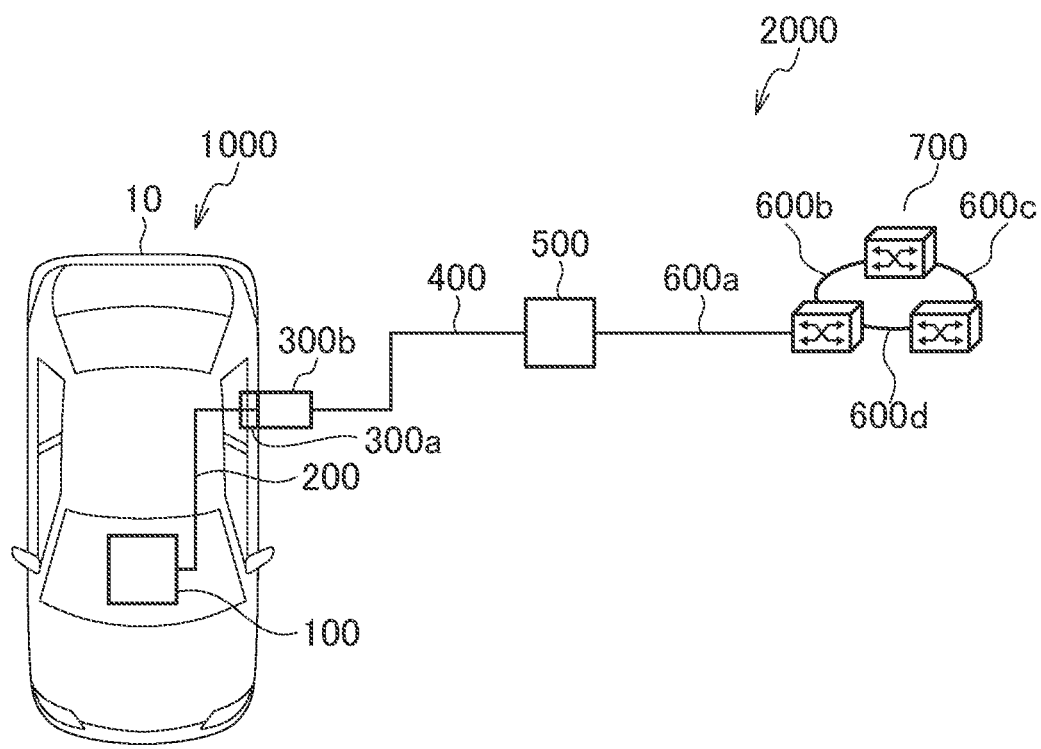
FIG. 1 is a schematic diagram illustrating an example of a configuration of a communication system according to the embodiment.

Examples of a moving body-mounted communication system and a communication system according to the present embodiment will be described in detail below with reference to the drawings. The embodiment described below is intended to provide comprehensive or specific examples. The numerical values, shapes, materials, component elements, arrangement positions and connection forms of the component elements, steps, an order of steps, and the like shown in the following embodiment, are examples and are not intended to be limited to the present disclosure. In addition, component elements in the following embodiment that are not described in the independent claims each of which represents a generic concept, are described as optional component elements. Furthermore, dimensional proportions in the drawings are exaggerated for convenience of explanation and may differ from actual proportions.

(Overview of Communication System)

As illustrated in FIG. 1, a communication system 2000 according to the embodiment enables high-speed connection between a next-generation connected car, which is a vehicle indicated by a moving body 10, and an information and communication network 700 outside the vehicle, through high-capacity wired communication with huge amounts of data handled by the next-generation connected car.

To achieve this, a transmission line that does not include modulation and demodulation processing, is employed between the information and communication network 700 and an information transmitting and receiving device in the moving body 10, thereby enabling direct connection between the information and communication network 700 and the information transmitting and receiving device in the moving body 10.

In conventional communication systems, for example, even when FTTH is used, optical signals are converted to electrical signals, electrical signal processing is executed, the processed electrical signals are converted to optical signals again, and communication with an external communication network is executed. However, in such a case, the modulation and demodulation processing is essential to the conversion process between optical and electrical signals, which causes delays in communication. Furthermore, if protocol conversion is required between the optical and electrical signals, further delays occur in communication, which makes low latency transmission difficult.

In addition, power consumption increases when branching and routing by signal conversion are required, as in the in-vehicle system disclosed in Patent Document 1. Furthermore, while Patent Document 1 requires the setting of a power-saving route in the vehicle, a moving body-mounted communication system 1000 according to the embodiment can reduce power consumption because the branching and routing are no longer necessary, and power calculation for the communication route is also unnecessary.

Furthermore, as described above, the communication system 2000 enables directly communicate with a large amount of data, such as a dynamic map required for the vehicle and sensing data collected by the vehicle, at high speed with the information and communication network 700 outside the vehicle.

In addition, the communication system 2000 does not perform modulation and demodulation processing or protocol conversion processing, which enables low latency transmission from the data center or cloud in the information and communication network 700 outside the vehicle.

(Communication System 2000)

FIG. 1 is a schematic diagram illustrating an example of the communication system 2000 that includes a simplified configuration of the moving body-mounted communication system 1000.

The communication system 2000 includes the moving body-mounted communication system 1000 including a vehicle as the moving body 10, an external connector 300b, a hybrid cable 400, an energy supply facility 500, and a first transmission line 600a. There is a case where the information and communication network 700 is included in the communication system 2000. The information and communication network 700 may be configured using first transmission lines 600b, 600c, and 600d as transmission lines. In this specification, there is a case where one or more of the first transmission line 600a, the first transmission line 600b, the first transmission line 600c, and the first transmission line 600d are collectively referred to as a first transmission line 600.

A first information transmitting and receiving device 100, a third transmission line 200, and an internal connector 300a included in the moving body-mounted communication system 1000 will be described in detail in the description of the moving body-mounted communication system 1000 below.

An energy supply transmission line 420 and a second transmission line 410 included in the hybrid cable 400 are connected to the external connector 300b. The external connector 300b can be formed of a material having any shape such as metal, resin, or the like. The external connector 300b is fitted with the internal connector 300a provided in the moving body 10. There is a case where the internal connector 300a is integrally formed with an exterior member of the moving body 10. In this case, the external connector 300b can be mounted to a portion corresponding to the internal connector 300a formed on the exterior member. The external connector 300b may be provided with an energy supply control unit such as a lever or switch not illustrated in the drawings, for controlling the supply of energy from the energy supply transmission line 420. In other words, the energy supply control unit and a transmission line not illustrated in the drawings for transmitting energy supply control information, may be included in the hybrid cable 400, and the transmission line may be connected to the energy supply facility 500.

The energy supply transmission line 420 and the second transmission line 410 are included in the hybrid cable 400. As an example, the hybrid cable 400 includes an outer sheath, and the energy supply transmission line 420 and the second transmission line 410 are included inside the outer sheath. The outer sheath is preferably of a structure or material that is flexible.

The second transmission line 410 is an optical fiber when a form of information to be transmitted in the first transmission line 600 and the third transmission line 200 is an optical signal. The second transmission line 410 is a metal cable when a form of information to be transmitted in the first transmission line 600 and the third transmission line 200 is an electric signal. In a frequency range used by the optical signal, frequency characteristics of the optical fiber as the second transmission line 410 preferably have flatness. Similarly, in a frequency range used by the electric signal, frequency characteristics of the metal cable as the second transmission line 410 preferably have flatness. Although the second transmission line 410 may be a single-mode optical fiber, there is case where it is preferable to use a multimode optical fiber from the standpoint of cost, rigidity, and ease of wiring.

The energy supply transmission line 420 is a power cable when the energy for the moving body 10 is electric power, or a flexible tubular object when the energy for the moving body 10 is light oil, gasoline, LP gas, or hydrogen.

As an example, the energy supply facility 500 is a gas station or a charging station. That is, when the energy to be supplied by the energy supply transmission line 420 is light oil, gasoline, or the like, the energy supply facility 500 is a gas station. When the energy to be supplied by the energy supply transmission line 420 is electric power, the energy supply facility 500 is a charging station. Instead of the charging station, the energy supply facility 500 may be an ordinary house or the like.

Figure 2:
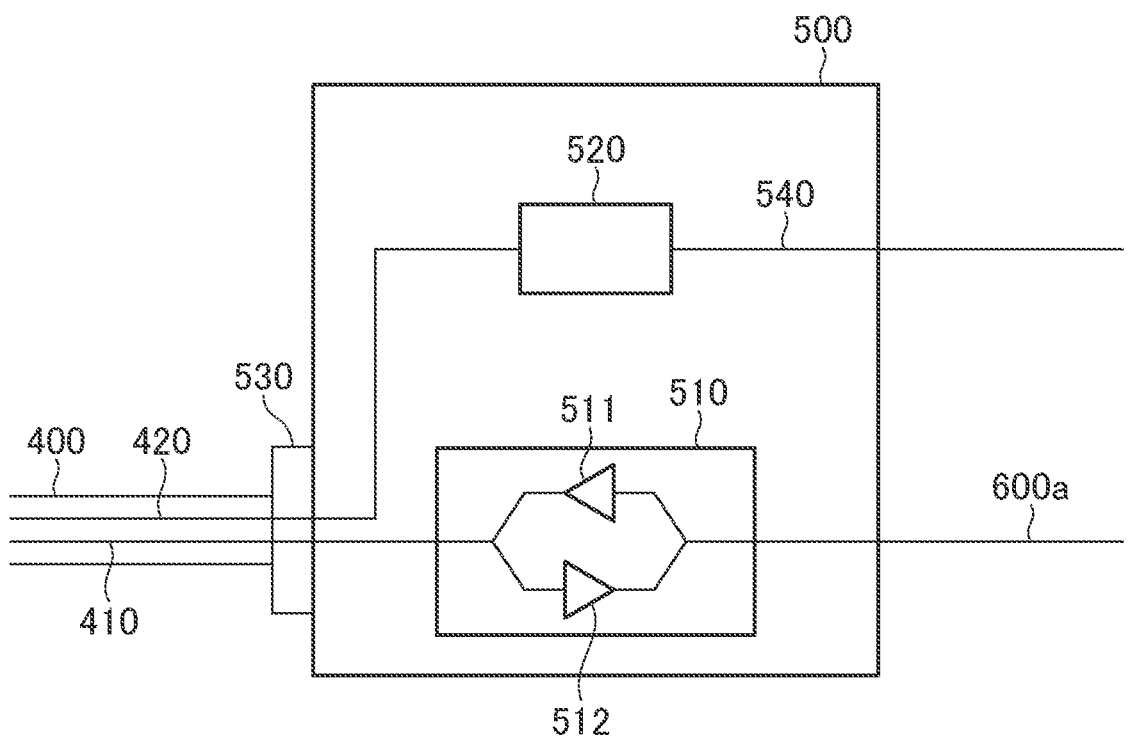
FIG. 2 is a schematic diagram illustrating an example of a configuration of an energy supply facility in FIG. 1.

The configuration of the energy supply facility 500 will be described using FIG. 2. As illustrated in FIG. 2, the energy supply facility 500 can be provided with an energy supply side connector 530 at an end of the hybrid cable 400 on an opposite side of the moving body 10. The hybrid cable 400 may be connected to the inside of the energy supply facility 500 without the energy supply side connector 530. The energy supply facility 500 includes an amplifier between the first transmission line 600 and the second transmission line 410. In FIG. 2, a configuration in which a receiving optical amplifier 511 and a transmitting optical amplifier 512 are included in the energy supply facility 500 by a configuration in which an optical branching device 510 with built-in optical amplifier is included when the first transmission line 600 and the second transmission line 410 are optical fibers, is illustrated. When the physical distance between the energy supply facility 500 and the information and communication network 700 is far, there is a case where an amplifier is necessary because a signal is greatly attenuated in the first transmission line 600 connecting the energy supply facility 500 and the information and communication network 700. Therefore, in FIG. 2, there is a case where it is possible to reduce an error rate of a receiving optical signal by amplifying the receiving optical signal that has propagated through the first transmission line 600 with the receiving optical amplifier 511. If the error rate of the receiving optical signal is reduced, the number of retransmission requests is likely to be reduced, and there is a case where high-speed data reception becomes possible. Similarly, there is a case where it is possible to reduce an error rate of a transmitting optical signal by amplifying the transmitting optical signal to be propagated through the first transmission path 600 with the transmitting optical amplifier 512. If the error rate of the transmitting optical signal is reduced, the number of retransmission requests is likely to be reduced, and there is a case where high-speed data reception may become possible. When the first transmission line 600 and the second transmission line 410 are single-core bi-directional optical fibers, the optical branching device 510 with built-in optical amplifier once separates optical signals into a receiving optical signal and a transmitting optical signal, amplifies each of them, and then combines the amplified optical signals again for transmission.

The energy supply facility 500 can include an energy storage device 520. For example, if the energy to be supplied to the moving body 10 is electric power, the energy storage 520 may be a battery. If the energy to be supplied to the moving 10 is light oil, gasoline, LP gas, or hydrogen, there is a case where the energy storage device 520 is preferably provided outside the energy supply facility 500. If the energy to be supplied to the moving body 10 is electric power, there is a case where an electric power supply cable 540 is required to store the electric power in the energy storage device 520.

The first transmission line 600 depends on the transmission line used in the information and communication network 700. When the information and communication network 700 is composed of optical fibers, the first transmission line 600 is an optical fiber. When the information and communication network 700 is composed of metal cables, the first transmission line 600 is a metal cable. As described above, in the frequency range used by the optical signal to be transmitted by the optical fiber, the frequency characteristics of the optical fiber as the first transmission line 600 preferably have flatness. Similarly, in the frequency range used by electrical signal to be transmitted by the metal cable, the frequency characteristics of the metal cable as the first transmission line 600 preferably have flatness.

The information and communication network 700 has functions of supplying to the moving body 10 a program to be used in the moving body 10, updating and supplying a program to the moving body 10, supplying a dynamic map to the moving body 10, and processing a large amount of data such as sensing data of the moving body 10. The information and communication network 700 is a network that is directly connected to the first information transmitting and receiving device 100 of the moving body 10 via the first transmission line 600, the second transmission line 410, and the third transmission line 200, and the like. Therefore, it is possible to transmit and receive a large amount of data at high speed and low latency between the information and communication network 700 and the first information transmitting and receiving device 100. The information and communication network 700 can have a function of diagnosing the moving body 10 in real time while the moving body 10 is stationary by means of state information indicating a vehicle state including sensing data received from the moving body 10. In addition, when the moving body 10 is a so-called connected car, the information and communication network 700 has a function of providing service information to the connected car and performing reception of information from the connected car. As an example, the information and communication network 700 is cloud computing. Since information and communication networks 700 is often configured by interconnecting optical cables, it is assumed that there are many cases where the first transmission line 600, the second transmission line 410, and the third transmission line 200 are also optical cables.

Optical fibers or optical waveguides can be used for transmission lines from the energy supply facility 500 to the first information transmitting and receiving device 100 or a second information transmitting and receiving device 230. The optical fibers or the optical waveguides may be single-mode optical fiber or multimode optical fiber. The material of the multimode optical fiber may be glass-based or plastic-based. In the case of wavelength multiplexing communication using the single-mode optical fiber, an arrayed waveguide grating (AWG) may be used for wavelength separation anywhere in the transmission lines. The first information transmitting and receiving device 100 or the second information transmitting and receiving device 230 may include a digital coherent signal processing circuit (DSP) not illustrated in the drawings. If the transmission lines from the energy supply facility 500 to the first information transmitting and receiving device 100 or the second information transmitting and receiving device 230 are single-core bi-directional, an optical amplifier may be incorporated in a bifurcated waveguide. If the transmission lines are not single-core bi-directional, a two- or multi-fiber optical fiber or a multi-core optical fiber may be used for transmission and reception.

(Moving Body-Mounted Communication System 1000)

The moving body-mounted communication system 1000 in FIG. 1 illustrates a simplified view of the components included in the moving body-mounted communication system 1000.

The moving body-mounted communication system 1000 in FIG. 1 mainly includes the internal connector 300a fitted with the external connector 300b described above, the third transmission line 200, and the first information transmitting and receiving device 100.

The internal connector 300a is connected to the energy supply transmission line 420 and the second transmission line 410 included in the hybrid cable 400 described above. As described above, there is a case where the internal connector 300a is integrally formed with the exterior member of the moving body 10. In this case, the external connector 300b can be mounted to a portion corresponding to the internal connector 300a formed on the exterior member. The portion corresponding to the internal connector 300a may be in the form of a socket.

When the first transmission line 600 and the second transmission line 410 are optical fibers, the third transmission line 200 is an optical fiber. When the first transmission line 600 and the second transmission line 410 are metal cables, the third transmission line 200 is a metal cable. Although the third transmission line 200 may be a single-mode optical fiber, there is a case where it is preferable to use a multimode optical fiber from the viewpoints of cost, rigidity, and ease of wiring.

The first information transmitting and receiving device 100 is an electronic device that is directly connected to the information and communication network 700 via the first transmission line 600, the second transmission line 410 and the third transmission line 200, and the like. When the first transmission line 600, the second transmission line 410 and the third transmission line 200 are optical cables, the first information transmitting and receiving device 100 includes an optical and electrical converter and an electrical and optical converter, which are not illustrated in the drawings. Inside the first information transmitting and receiving device 100, information is processed as electrical signals. The first information transmitting and receiving device 100 includes an in-vehicle I/F unit 130, which will be described later, and can be connected to electronic devices such as a vehicle control device, a vehicle sensing device, a device for acquiring information around the vehicle, and an entertainment device as in-vehicle devices. The vehicle control device may include a navigation equipment and an automatic driving control equipment.

(Examples of Configuration of Moving Body-Mounted Communication System 1000)

Next, examples of the configuration of the moving body-mounted communication system 1000 will be described with reference to FIGS. 3 to 6.

Figure 3:
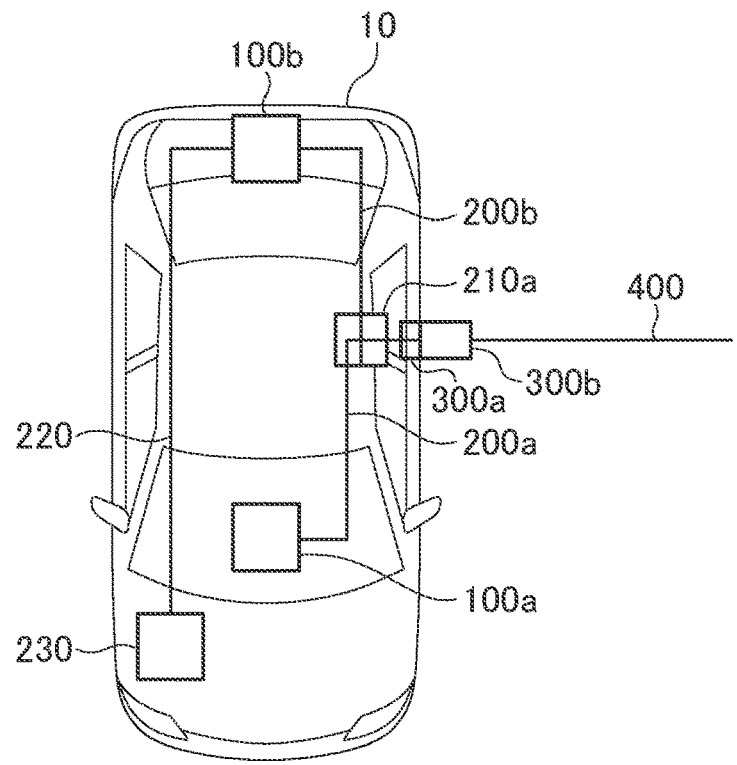
FIG. 3 is a schematic diagram illustrating an example of a configuration of a moving body-mounted communication system according to the embodiment.

FIG. 3 illustrates one example of a moving body-mounted optical network including a third transmission line 200a, an optical branching device 210a, a third transmission line 200b, and a fourth transmission line 220. The moving body-mounted optical network also includes a first information transmitting and receiving device 100a, a first information transmitting and receiving device 100b, and the second information transmitting and receiving device 230 each of which transmits and receives information. In the specification, there is a case where one or more of the first information transmitting and receiving device 100a, the first information transmitting and receiving device 100b, and a first information transmitting and receiving device 100c (see FIG. 4, etc.) are collectively referred to as the first information transmitting and receiving device 100. Also, in the specification, there is a case where one or more of the third transmission line 200a, the third transmission line 200b, a third transmission line 200c (see FIG. 4, etc.), a third transmission line 200d (see FIG. 5), a third transmission line 200e (see FIG. 6), and a third transmission line 200f (see FIG. 5) are collectively referred to as the third transmission line 200. Further, in the specification, there is a case where one or more of the optical branching device 210a, an optical branching device 210b (see FIG. 4, etc.), and an optical branching device 210c (see FIG. 5) are collectively referred to as an optical branching device 210.

The first information transmitting and receiving device 100 is an electronic device that is directly connected to the information and communication network 700 via the first transmission line 600, the second transmission line 410, and the third transmission line 200, etc, and communicates directly with the information and communication network 700. The second information transmitting and receiving device 230 is an electronic device that is directly connected to the first information transmitting and receiving device 100, and communicates indirectly with the information and communication network 700 via the first information transmitting and receiving device 100. The second information transmitting and receiving device 230 may be an electronic device whose communication speed is lower than the communication speed in the information and communication network 700. In this case, since the communication speed between the second information transmitting and receiving device 230 and the first information transmitting and receiving device 100b is lower than the communication speed in the information and communication network 700, the fourth transmission line 220 may be a metal cable. The fourth transmission line 220 is not limited to a metal cable, but may also be an optical fiber. Furthermore, an electronic device having a communication speed higher than the communication speed in the information and communication network 700 may be used for the second information transmitting and receiving device 230.

The internal connector 300a mounted on the moving body 10 in FIG. 3 is connected to the external connector 300b. The hybrid cable 400 including the second transmission line 410 and the energy supply transmission line 420 is connected to the external connector 300b. Energy supplied via the energy supply transmission line 420 is supplied to the moving body 10 via the internal connector 300a. When the second transmission line 410 is an optical fiber, the optical signal transmitted through the second transmission line 410 is branched into an optical signal to be transmitted through the third transmission line 200a and an optical signal to be transmitted through the third transmission line 200b in the optical branching device 210a. A power ratio of the branched optical signals can be divided into any ratio in the moving body-mounted communication system 1000. An optical cable not indicated by a reference sign in the drawings may be connected between the internal connector 300a and the optical branching device 210a. The internal connector 300a and the optical branching device 210a may be directly connected. The optical branch device 210a can combine optical signals transmitted from the third transmission line 200a and the third transmission line 200b, and transmit the combined optical signals in the second transmission line 410. There is a case where it is desirable for the first information transmitting and receiving device 100b, which is directly connected to the second information transmitting and receiving device 230, to include a data buffer section for communication with the second information transmitting and receiving device 230.

According to the moving body-mounted communication system 1000 having the above configuration, modulation and demodulation processing and protocol conversion processing are not performed from the information and communication network 700 to the first information transmission and reception device 100, thus enabling high-speed and low-latency transmission with the information and communication network 700. In addition, even if there are low-speed electronic devices such as the second information transmitting and receiving device 230 in the in-vehicle network, the low-speed electronic devices can be configured to communicate with the information and communication network 700 via the first information transmitting and receiving device 100. The configuration enables the moving body-mounted communication system 1000 to perform high-speed transmission and low-latency transmission with the information and communication network 700, thus enabling low-speed processing to be performed in the moving body-mounted communication system 1000 after transmission with the information and communication network 700.

Figure 4:
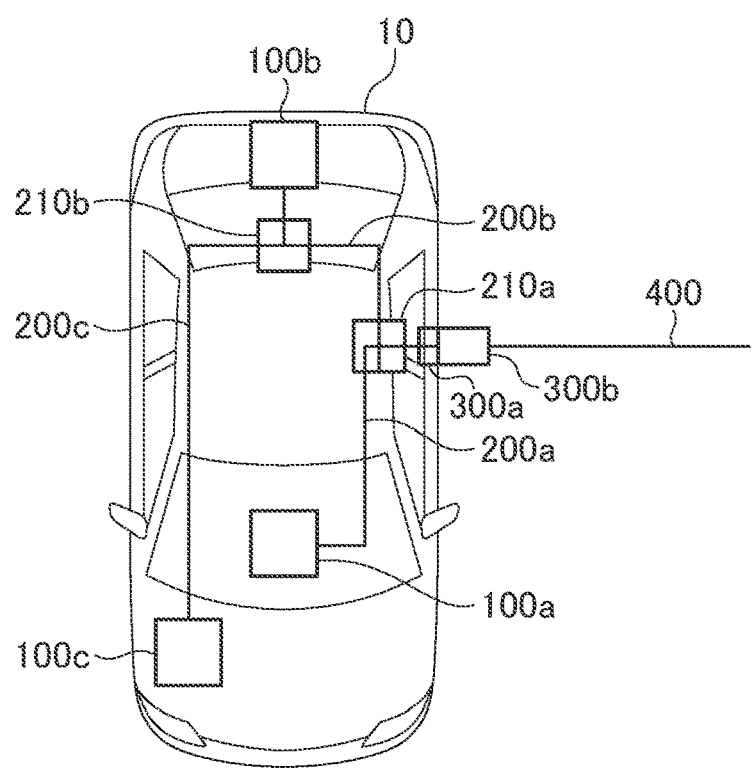
FIG. 4 is a schematic diagram illustrating another example of the configuration of the moving body-mounted communication system according to the embodiment.

FIG. 4 illustrates one example of the moving body-mounted optical network including the third transmission line 200a, the optical branching device 210a, the third transmission line 200b, the optical branching device 210b, and the third transmission line 200c. The moving body-mounted optical network also includes the first information transmitting and receiving device 100a, the first information transmitting and receiving device 100b, and the first information transmitting and receiving device 100c each of which transmits and receives information.

Descriptions for the parts that have the same configuration as in FIG. 3 are omitted to avoid duplication of description. In other words, the descriptions of the third transmission line 200a, the optical branching device 210a, a portion of the third transmission line 200b that is connected to the optical branching device 210a, the internal connector 300a, the external connector 300b, and the hybrid cable 400 are omitted.

Therefore, the moving body-mounted communication system 1000 of FIG. 4 differs from the configuration of FIG. 3 in that the first information transmitting and receiving device 100c can be arranged to communicate directly with the information and communication network 700, instead of the second information transmitting and receiving device 230. In other words, the optical branching device 210b is connected to the third transmission line 200b, and the first information transmission and reception device 100c can communicate with the first information transmitting and receiving device 100b via the optical branching device 210b. This configuration enables all the first information transmitting and receiving devices 100 in the moving body-mounted communication system 1000 to communicate directly with the information and communication network 700. In this case, the third transmission line 200c is preferably an optical fiber. In this way, the moving body-mounted optical network in FIG. 4 is also called a so-called PON (Passive Optical Network) because one optical fiber is shared by multiple transmitting and receiving devices by distributing optical branching devices in the middle of the optical fiber network.

According to the moving body-mounted communication system 1000 having the above configuration, all information transmitting and receiving devices in the moving body-mounted communication system 1000 can be directly connected to the information and communication network 700, enabling high-speed and low-latency transmissions.

Figure 5:
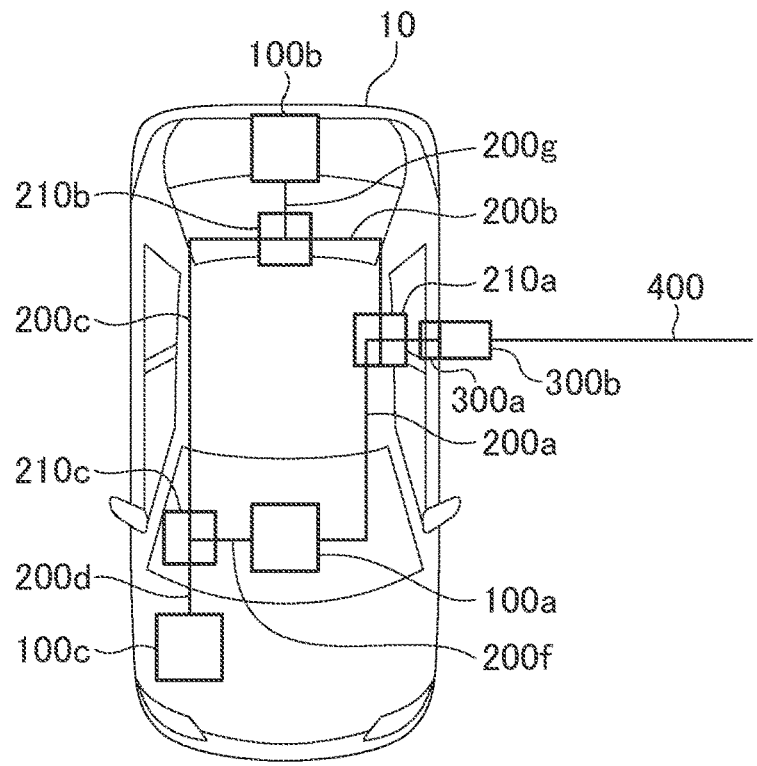
FIG. 5 is a schematic diagram illustrating another example of the configuration of the moving body-mounted communication system according to the embodiment.

FIG. 5 illustrates one example of the moving body-mounted optical network including the third transmission line 200a, the optical branching device 210a, the third transmission line 200b, the optical branching device 210b, the third transmission line 200c, the optical branching device 210c, a third transmission line 200d, and a third transmission line 200f. The moving body-mounted optical network also includes the first information transmitting and receiving device 100a, the first information transmitting and receiving device 100b, and the first information transmitting and receiving device 100c each of which transmits and receives information.

Descriptions for the parts that have the same configuration as in FIG. 4 are omitted to avoid duplication of description. In other words, the descriptions of the third transmission line 200a, the optical branching device 210a, the third transmission line 200b, the optical branching device 210b, the internal connector 300a, the external connector 300b, and the hybrid cable 400 are omitted.

Therefore, the moving body-mounted communication system 1000 of FIG. 5 differs from the configuration of FIG. 4 in that the first information transmitting and receiving device 100c is connected to the third transmission line 200c and the third transmission line 200f via the third transmission line 200d and the optical branching device 210c. The first information transmitting and receiving device 100c is also connected to the first information transmitting and receiving device 100a via the third transmission line 200f.

The moving body-mounted optical network in FIG. 5 has a configuration in which a ring network and a star network are combined. As with the moving body-mounted communication system 1000 which is the PON in FIG. 4, all the information transmitting and receiving devices in the moving body-mounted communication system 1000 can be directly connected to the information and communication network 700, enabling high-speed and low-latency transmissions.

It is noted that the first information transmitting and receiving device 100a in FIG. 5 may have different carrier frequencies of transmission signals in clockwise and counterclockwise directions, in the ring-type network including the third transmission line 200a, the third transmission line 200b, the third transmission line 200c, and the third transmission line 200f. The carrier frequencies that can be used in the third transmission line 200a, the optical branching device 210a, the third transmission line 200b, the optical branching device 210b, the third transmission line 200c, the optical branching device 210c, the third transmission line 200f, and the like, are stored in a storage unit 150 in advance.

Figure 6:
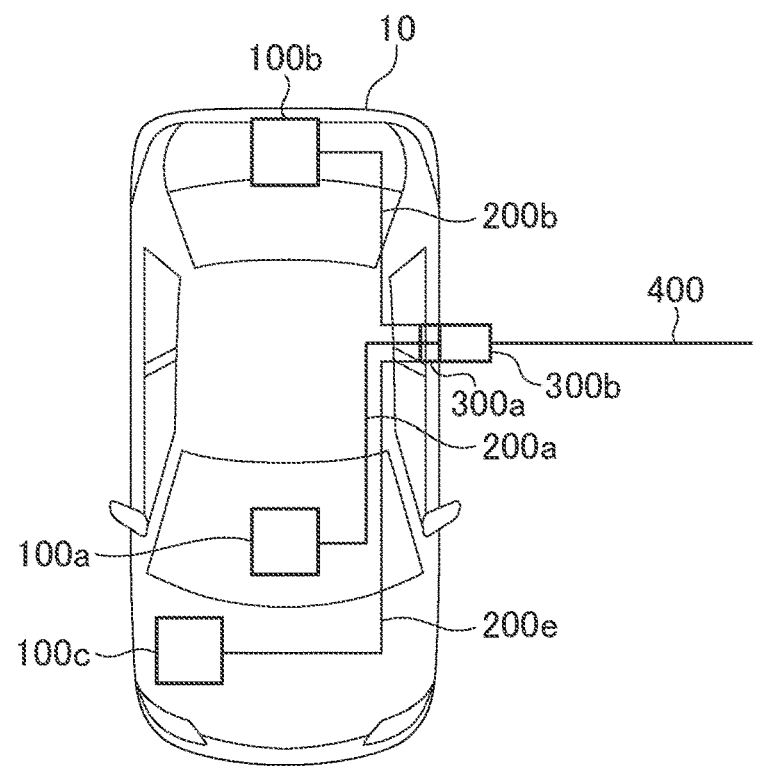
FIG. 6 is a schematic diagram illustrating another example of the configuration of the moving body-mounted communication system according to the embodiment.

FIG. 6 illustrates one example of the moving body-mounted optical network in which the second transmission line 410 included in the hybrid cable 400 is a multi-fiber optical fiber, for example, a three-fiber optical fiber, or in which the second transmission line 410 included in the hybrid cable 400 is a multi-core optical fiber, for example, a three-core optical fiber. In other words, when the second transmission line 410 is a multi-fiber optical fiber, FIG. 6 shows a configuration in which the third transmission lines 200, which has the same number as fibers in the multi-fiber optical fiber, are formed. One first information transmitting and receiving device 100 is connected to each third transmission line 200. When the second transmission line 410 is a multi-core optical fiber, FIG. 6 shows a configuration in which the third transmission lines 200, which has the same number as cores in the multi-core optical fiber, are formed. One first information transmitting and receiving device 100 is connected to each third transmission line 200.

When the second transmission line 410 is a three-fiber optical fiber, the external connector 300b may include an MPO (Multi-fiber Push-On) optical connector. In this case, three third transmission lines 200a, 200b, and 200e are connected to the internal connector 300a. Transmission lines having the same number as fibers in the second transmission line 410 are formed, and each transmission line allows a direct connection to the information and communication network 700. When the second transmission line 410 is a three-core optical fiber, the external connector 300b may include a connector for MCF (Multi-Core Fiber) for branching and coupling of the multi-core optical fiber and the single-core optical fiber. Since the connector for MCF is a known technology, the details are omitted herein. In this case, the third transmission lines 200a, 200b, and 200e, which are three single-core optical fibers, are connected to the internal connector 300a. Transmission lines having the same number as cores in the second transmission line 410 are formed, and each transmission line allows a direct connection to the information and communication network 700.

In FIG. 6, the first information transmitting and receiving device 100a is connected to the third transmission line 200a, and the first information transmitting and receiving device 100a can communicate directly with the information and communication network 700. Similarly, the first information transmitting and receiving device 100b is connected to the third transmission line 200b, and the first information transmitting and receiving device 100b can communicate directly with the information and communication network 700. Furthermore, the first information transmitting and receiving device 100c is connected to the third transmission line 200e, and the first information transmitting and receiving device 100c can communicate directly with the information and communication network 700.

As illustrated in FIG. 6, according to a configuration in which a multi-core optical fiber, which is an optical fiber with multiple cores arranged in one cladding, is used as the second transmission line 410, different information can be transmitted for each core, which increases an amount of information (transmission capacity) to be transmitted in one optical fiber. According to this configuration, it is possible to connect a different first information transmitting and receiving device 100 for each core. In this case, since the multi-core optical fiber is used as the second transmission line 410, it is possible to realize large-capacity data transmission without interfering with the flexibility of the hybrid cable 400. Similarly, as illustrated in FIG. 6, according to a configuration in which a multi-fiber optical fiber is used as the second transmission line 410, it is possible to connect a different first information transmitting and receiving device 100 for each fiber. In this case, while providing strength to the second transmission line 410, it is possible to realize high-capacity data transmission without interfering with the flexibility of the hybrid cable 400.

(Example of Configuration of First Information Transmitting and Receiving Device)

Figure 7:
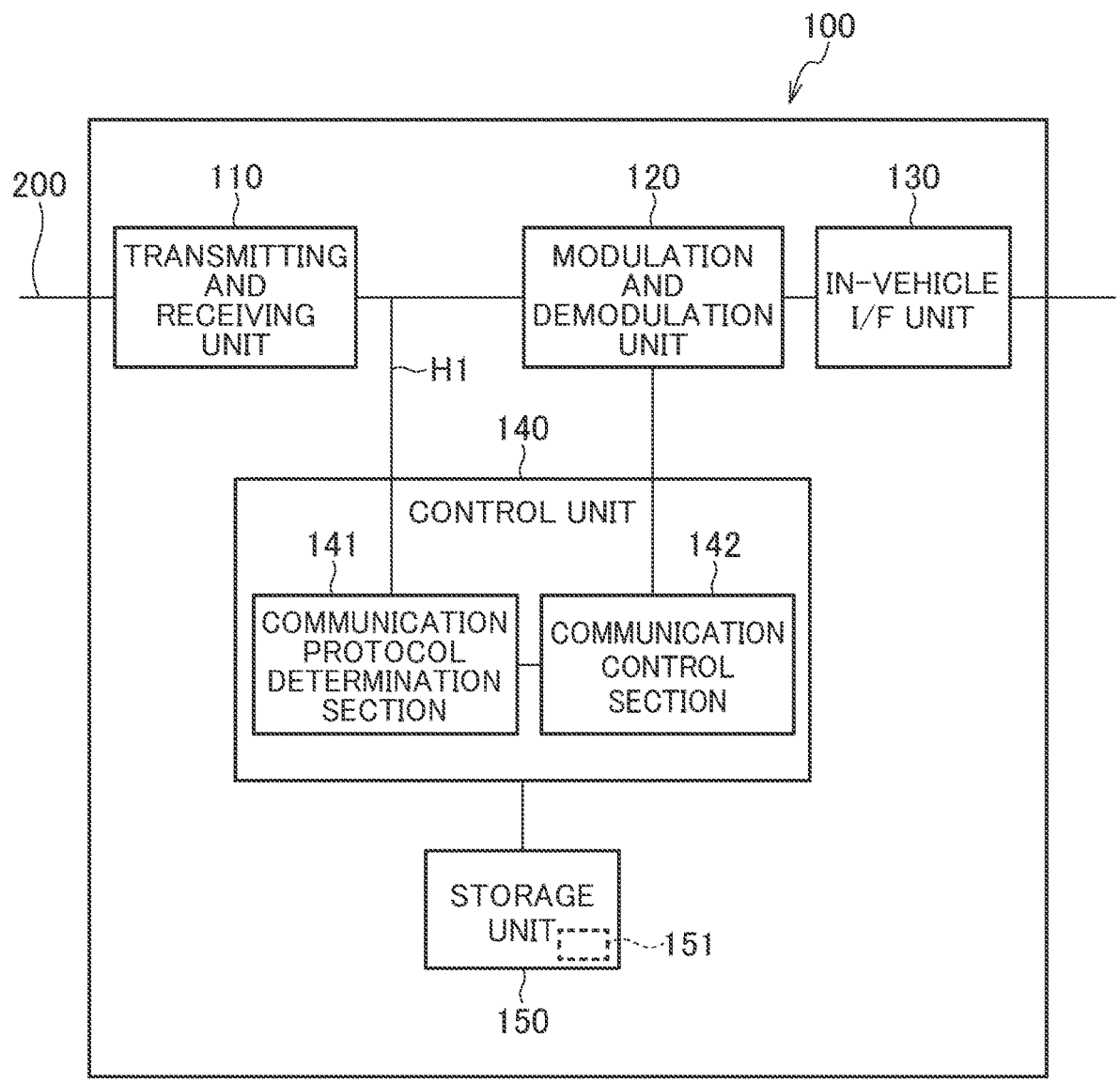
FIG. 7 is a block diagram illustrating an example of a configuration of an information transmitting and receiving device according to the embodiment.

FIG. 7 is a block diagram illustrating an example of a configuration of the first information transmitting and receiving device 100.

The first information transmitting and receiving device 100 includes a transmitting and receiving unit 110 connectable to the third transmission line 200, a modulation and demodulation unit 120, the in-vehicle I/F (Inter Face) unit 130, a control unit 140, and the storage unit 150. The control unit 140 includes a communication protocol determination section 141 and a communication control section 142.

The transmitting and receiving unit 110 includes an optical and electrical converter (not illustrated) for receiving an optical signal, and an electrical and optical converter (not illustrated) for transmitting an optical signal when the third transmission line 200 is an optical fiber. In this case, it is preferable that information is processed by electrical signals in the first information transmitting and receiving device 100. An example of the optical and electrical converter includes a photodiode. Examples of the electrical and optical converter include a semiconductor laser, LED, and the like. The frequency characteristics of the optical and electrical converter and the electrical and optical converter need to have good characteristics in a high frequency range so as not to affect a transmission speed of the optical signal in the third transmission line 200. In other words, the transmission speed of the optical signal in the third transmission line 200 needs to be unaffected by conversion speeds of the optical and electrical converter and the electrical and optical converter.

The modulation and demodulation unit 120 includes a demodulator (not illustrated) that demodulates an electrical signal received from the transmitting and receiving unit 110, and a modulator (not illustrated) that generates a signal to be output to the transmitting and receiving unit 110. A signal processing speed in the modulation and demodulation unit 120 is equal to or faster than a signal processing speed in an electronic device directly connected to the first transmission line 600 of the information and communication network 700. Therefore, it is possible to suppress the reduction of the transmission speed when the first information transmitting and receiving device 100 is directly connected to the information and communication network 700.

The in-vehicle I/F unit 130 includes an interface function with a device such as a sensor or an electronic device that is connectable to the first information transmitting and receiving device 100. An ECU (Electronic Control Unit) may be configured by the device or the electronic device connectable to the in-vehicle I/F unit 130. Examples of the electronic device include an electronic device such as a vehicle control device, a vehicle sensing device, a vehicle peripheral information acquisition device, and an entertainment device as an in-vehicle device. Examples of the vehicle control device include a navigation device and an automatic driving control device.

The communication protocol determination section 141 has a function of determining a communication protocol such that a logical communication protocol in the moving body-mounted communication system 1000 matches a logical communication protocol used in the information and communication network 700. The communication protocol may be stored in the storage unit 150 in advance, or the communication protocol determination section 141 analyzes and determines a signal received in the transmitting and receiving section 110. For example, the communication protocol determination section 141 analyzes a protocol of a transmission and reception signal H1 transferred between the transmitting and receiving unit 110 and the modulation and demodulation unit 120. The logical communication protocol used in the information and communication network 700 may be input to the communication protocol determination section 141 from an input section (not illustrated) mounted in the first information transmitting and receiving device 100. The logical communication protocol used in the information and communication network 700 may be input to the communication protocol determination section 141 via the in-vehicle I/F unit 130.

The communication control section 142 has a function to cause the modulation and demodulation unit 120 to modulate and demodulate a transmission and reception signal based on the communication protocol determined in the communication protocol determination section 141. Information such as a parameter necessary for the modulation and demodulation processing may be stored in the storage unit 150. The communication control section 142 can have a function to perform input and output control processing of data and control information with an in-vehicle device connected to the first information transmitting and receiving device 100 via the in-vehicle I/F unit 130. The communication control section 142 can have a function to act as a master in the moving body-mounted communication system 1000 to execute synchronization and communication availability control in communication in the moving body 10. The communication control section 142 can be a master when executing direct communication between the information and communication network 700 and the first information transmitting and receiving device 100. An electronic device in the information and communication network 700 may control communication between the information and communication network 700 and the first information transmitting and receiving device 100 within a range where a security of information in the moving body-mounted communication system 1000 is ensured. The range where the security is ensured may be determined by each layer of a communication protocol, or by multiple layers of the communication protocol. As an example, if the security of the information of the moving body-mounted communication system 1000 is ensured at an application layer, a control right of the application layer of the moving body-mounted communication system 1000 can be transferred to the electronic device in the information and communication network 700.

The storage unit 150 stores at least one or more of a control program of the first information transmitting and receiving device 100, information such as a parameter of the modulation and demodulation unit 120, a communication protocol or related information thereof, and data or control programs of an in-vehicle device connectable to the in-vehicle I/F unit 130. When an ECU is configured by a device or an electronic device connectable to the in-vehicle I/F unit 130 of the first information transmitting and receiving device 100, the storage unit 150 may store a control program of the ECU. The storage unit 150 may store a large amount of data such as a dynamic map and sensing data. When the first information transmitting and receiving device 100 is directly connected to the second information transmitting and receiving device 230, the storage unit 150 can include a data buffer section 151. As described above, the dynamic map may be a digital map that combines a vast amount of ever-changing dynamic information such as "traffic regulation and construction information, accidents and congestion, or pedestrian and signal information" with static information such as high-precision three-dimensional position information (road surface information, lane information, three-dimensional structures).

The configuration of the second information transmitting and receiving device 230 is not described using a block diagram that distinguishes it from the first information transmitting and receiving device 100, but the second information transmitting and receiving device 230 can have blocks having the same functions as the first information transmitting and receiving device 100 in FIG. 7. However, there is a case where a transmitting and receiving speed of the transmitting and receiving unit 110 and a modulation and demodulation speed in the modulation and demodulation unit 120 of the first information transmitting and receiving device 100 are faster than those of the corresponding blocks of the second information transmitting and receiving device 230. Also, there is a case where the second information transmitting and receiving device 230 does not include the communication protocol determination section 141.

(Example of Operation of Moving Body-Mounted Communication System 1000 Communicating with Information and Communication Network 700)

Figure 8:
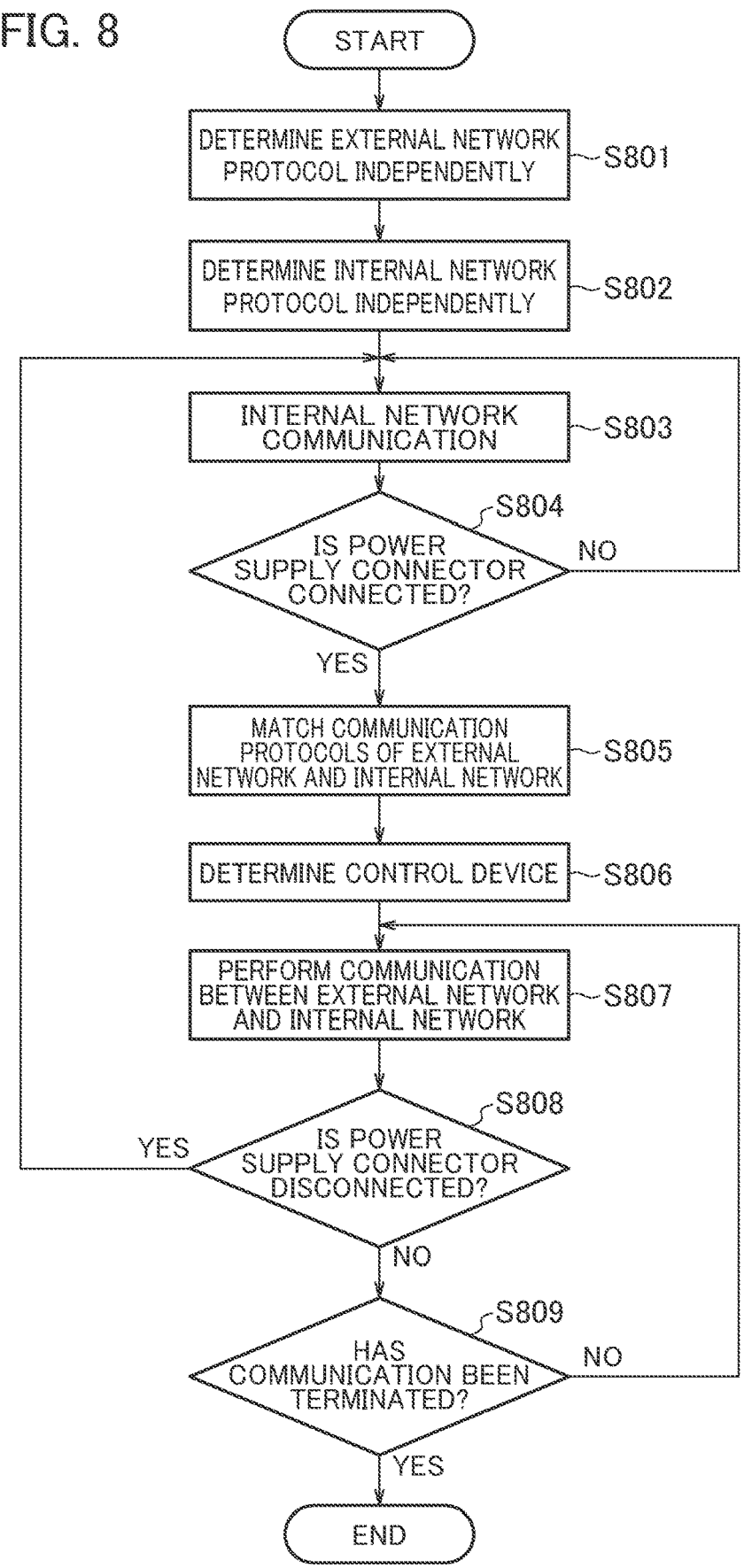
FIG. 8 is a flowchart illustrating an example of an operation of the moving body-mounted communication system according to the embodiment.

FIG. 8 is a flowchart illustrating an example of operation when the moving body-mounted communication system 1000 communicates with the information and communication network 700. The flowchart in FIG. 8 describes a case where a logical communication protocol of the information and communication network 700 and a logical communication protocol of the moving body-mounted communication system 1000 are matched with each other after the external connector 300b, which also functions as a power supply connector, is connected to the internal connector 300a.

In step S801, the logical communication protocol in the information and communication network 700 is determined. The logical communication protocol in the information and communication network 700 is determined independently from the logical communication protocol in the moving body-mounted communication system 1000. Therefore, it is assumed that the logical communication protocols in the information and communication network 700 and the moving body-mounted communication system 1000 are different, but they may be the same logical communication protocol.

In step S802, the logical communication protocol of the moving body-mounted communication system 1000 is determined. The logical communication protocol of the moving body-mounted communication system 1000 is determined independently of the logical communication protocol in the information and communication network 700.

In step S803, when a data transmission is requested in the first information transmitting and receiving device 100, another first information transmitting and receiving device 100, or the second information transmitting and receiving device 230 of the moving body-mounted communication system 1000, a data transmission and reception is performed in the moving body-mounted communication system 1000. Any of the first information transmitting and receiving device 100 and another first information transmitting and receiving device 100 can function as a master. Next, the first information transmitting and receiving device 100 proceeds to step S804.

In step S804, the first information transmitting and receiving device 100 determines whether or not the external connector 300b, which also functions as a power supply connector, is connected to the internal connector 300a. A configuration for determining whether or not the external connector 300b is connected to the internal connector 300a will be described in detail in FIG. 10. If the external connector 300b is connected to the internal connector 300a (step S804: YES), the first information transmitting and receiving device 100 proceeds to step S805. If the external connector 300b is not connected to the internal connector 300a (step S804: NO), the first information transmitting and receiving device 100 returns to step S803 and continues to perform communication in the moving body 10.

In step S805, the logical communication protocol of the moving body-mounted communication system 1000 can be determined by the communication protocol determination section 141 to be consistent with the logical communication protocol of the information communication network 700 by analyzing the transmission and reception signal H1. For example, it is preferable that the logical communication protocol of the moving body-mounted communication system 1000 completely matches the logical communication protocol in the information and communication network 700. However, a part of logical communication protocols in the OSI reference model in the OSI (Open Systems Interconnection) may be matched with the logical communication protocols of the moving body-mounted communication system 1000 and the information and communication network 700. For example, a communication protocol in the application layer of the OSI reference model is matched with the logical communication protocols of the moving body-mounted communication system 1000 and the information and communication network 700. Next, the first information transmitting and receiving device 100 proceeds to step S806.

In step S806, the first information transmitting and receiving device 100 determines a control device as a master that allows the moving body-mounted communication system 1000 to communicate with the information and communication network 700. Any of the first information transmitting and receiving device 100 and another first information transmitting and receiving device 100, or any of the electronic devices in the information and communication network 700 can function as a master. The control device that functions as the master may be determined in advance, or the control device that functions as the master may be determined by performing transmission and reception of control information when the moving body-mounted communication system 1000 and the information and communication network 700 are connected. Next, the first information transmitting and receiving device 100 proceeds to step S807.

In step S807, communication is performed between the moving body-mounted communication system 1000 and the information and communication network 700. In the communication between the moving body-mounted communication system 1000 and the information and communication network 700, the information is transferred without any change in an information form and without performing an electrical and optical conversion process, a modulation and demodulation process, and a protocol conversion process.

In step S808, the first information transmitting and receiving device 100 determines whether or not the connection between the external connector 300*b*, which also functions as a power supply connector, and the internal connector 300*a* has been disconnected. For example, the connection between the external connector 300*b* and the internal connector 300*a* is disengaged when an energy supplied to the moving body 10 from the external connector 300*b* reaches a full amount that can be stored in the moving body 10. A configuration for determining whether or not the external connector 300*b* is connected to the internal connector 300*a* will be described in detail in FIG. 10. If the external connector 300*b* is disconnected from the internal connector 300*a* (step S808: YES), the first information transmitting and receiving device 100 returns to step S803. If the external connector 300*b* is not disconnected from the internal connector 300*a* (step S808: NO), the first information transmitting and receiving device 100 proceeds to step S809.

In step S809, the control device acting as the master determined in step S806, determines whether or not the communication between the moving body-mounted communication system 1000 and the information and communication network 700 has been terminated. If the communication between the moving body-mounted communication system 1000 and the information and communication network 700 has been terminated (step S809: YES), the control device terminates the communication process. If the communication between the moving body-mounted communication system 1000 and the information and communication network 700 has not been terminated (step S809: NO), the control device continue the communication process.

The communication between the moving body-mounted communication system 1000 and the information and communication network 700 is performed at a communication speed in the information and communication network 700 as a backbone network, for example. Therefore, it is expected that high speed and low latency communication is achieved between the moving body-mounted communication system 1000 and the information and communication network 700, and that the communication is completed before the energy supply to the mobile 10 is completed.

Figure 9:
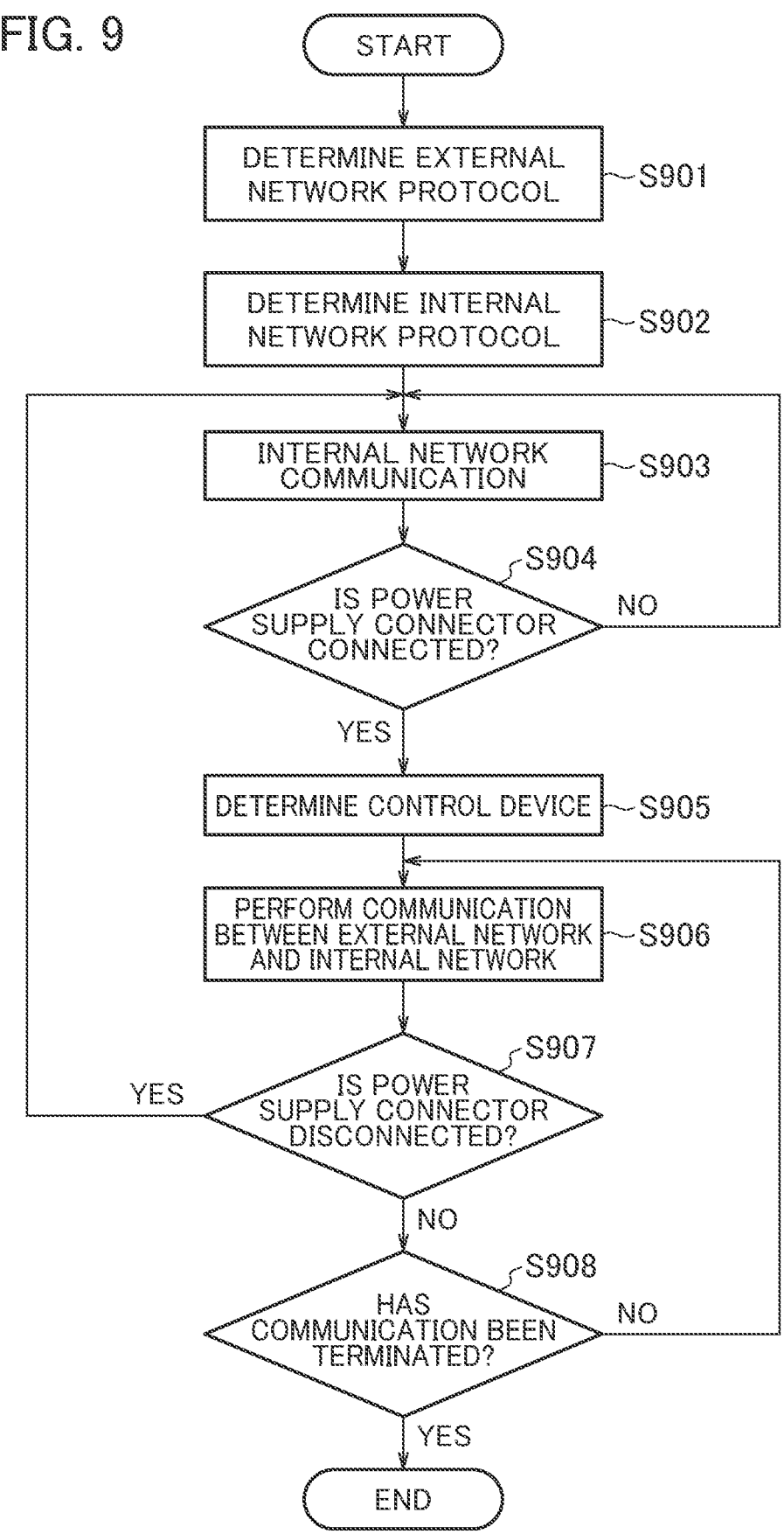
FIG. 9 is a flowchart illustrating an example of another operation of the moving body-mounted communication system according to the embodiment.

FIG. 9 is a flowchart illustrating another example of operation when the moving body-mounted communication system 1000 communicates with the information and communication network 700. The flowchart in FIG. 9 describes a case where a logical communication protocol of the information and communication network 700 and a logical communication protocol of the moving body-mounted communication system 1000 are matched with each other before the external connector 300*b*, which also functions as a power supply connector, is connected to the internal connector 300*a*.

In step S901, the logical communication protocol in the information and communication network 700 is determined. The logical communication protocol may be stored in the storage unit 150 of the first information transmitting and receiving device 100 in advance. The communication protocol determination section 141 may analyze and determine the logical communication protocol of the information and communication network 700 in a state where the first information transmitting and receiving device 100 is connected to the information and communication network 700 in advance.

In step S902, the logical communication protocol of the moving body-mounted communication system 1000 is determined. The logical communication protocol of the moving body-mounted communication system 1000 can be determined by the communication protocol determination section 141 to be consistent with the logical communication protocol of the information communication network 700 by analyzing the transmission and reception signal H1. For example, it is preferable that the logical communication protocol of the moving body-mounted communication system 1000 completely matches the logical communication protocol in the information and communication network 700. However, a part of logical communication protocols in the OSI reference model in the OSI may be matched with the logical communication protocols of the moving body-mounted communication system 1000 and the information and communication network 700. For example, a communication protocol in the application layer of the OSI reference model is matched with the logical communication protocols of the moving body-mounted communication system 1000 and the information and communication network 700.

In step S903, when a data transmission is requested in the first information transmitting and receiving device 100, another first information transmitting and receiving device 100, or the second information transmitting and receiving device 230 of the moving body-mounted communication system 1000, a data transmission and reception is performed in the moving body-mounted communication system 1000. Any of the first information transmitting and receiving device 100 and another first information transmitting and receiving device 100 can function as a master. Next, the first information transmitting and receiving device 100 proceeds to step S904.

In step S904, the first information transmitting and receiving device 100 determines whether or not the external connector 300*b*, which also functions as a power supply connector, is connected to the internal connector 300*a*. A configuration for determining whether or not the external connector 300*b* is connected to the internal connector 300*a* will be described in detail in FIG. 10. If the external connector 300*b* is connected to the internal connector 300*a* (step S904: YES), the first information transmitting and receiving device 100 proceeds to step S905. If the external connector 300*b* is not connected to the internal connector 300*a* (step S904: NO), the first information transmitting and receiving device 100 returns to step S903 and continues to perform communication in the moving body 10.

In step S905, the first information transmitting and receiving device 100 determines a control device as a master that allows the moving body-mounted communication system 1000 to communicate with the information and communication network 700. Any of the first information transmitting and receiving device 100 and another first information transmitting and receiving device 100, or any of the electronic devices in the information and communication network 700 can function as a master. The control device that functions as the master may be determined in advance, or the control device that functions as the master may be determined by performing transmission and reception of control information when the moving body-mounted communication system 1000 and the information and communication network 700 are connected.

In step S906, communication is performed between the moving body-mounted communication system 1000 and the information and communication network 700. In the communication between the moving body-mounted communication system 1000 and the information and communication network 700, the information is transferred without any change in an information form and without performing an electrical and optical conversion process, a modulation and demodulation process, and a protocol conversion process.

In step S907, the first information transmitting and receiving device 100 determines whether or not the connection between the external connector 300b, which also functions as a power supply connector, and the internal connector 300a has been disconnected. For example, the connection between the external connector 300b and the internal connector 300a is disengaged when an energy supplied to the moving body 10 from the external connector 300b reaches a full amount that can be stored in the moving body 10. A configuration for determining whether or not the external connector 300b is connected to the internal connector 300a will be described in detail in FIG. 10. If the external connector 300b is disconnected from the internal connector 300a (step S907: YES), the first information transmitting and receiving device 100 returns to step S903. If the external connector 300b is not disconnected from the internal connector 300a (step S907: NO), the first information transmitting and receiving device 100 proceeds to step S908.

In step S908, the control device acting as the master determined in step S905, determines whether or not the communication between the moving body-mounted communication system 1000 and the information and communication network 700 has been terminated. If the communication between the moving body-mounted communication system 1000 and the information and communication network 700 has been terminated (step S908: YES), the control device terminates the communication process. If the communication between the moving body-mounted communication system 1000 and the information and communication network 700 has not been terminated (step S908: NO), the control device continue the communication process. The communication between the moving body-mounted communication system 1000 and the information and communication network 700 is performed at a communication speed in the information and communication network 700 as a backbone network, for example. Therefore, it is expected that high speed and low latency communication is achieved between the moving body-mounted communication system 1000 and the information and communication network 700, and that the communication is completed before the energy supply to the mobile 10 is completed.

Figure 10:
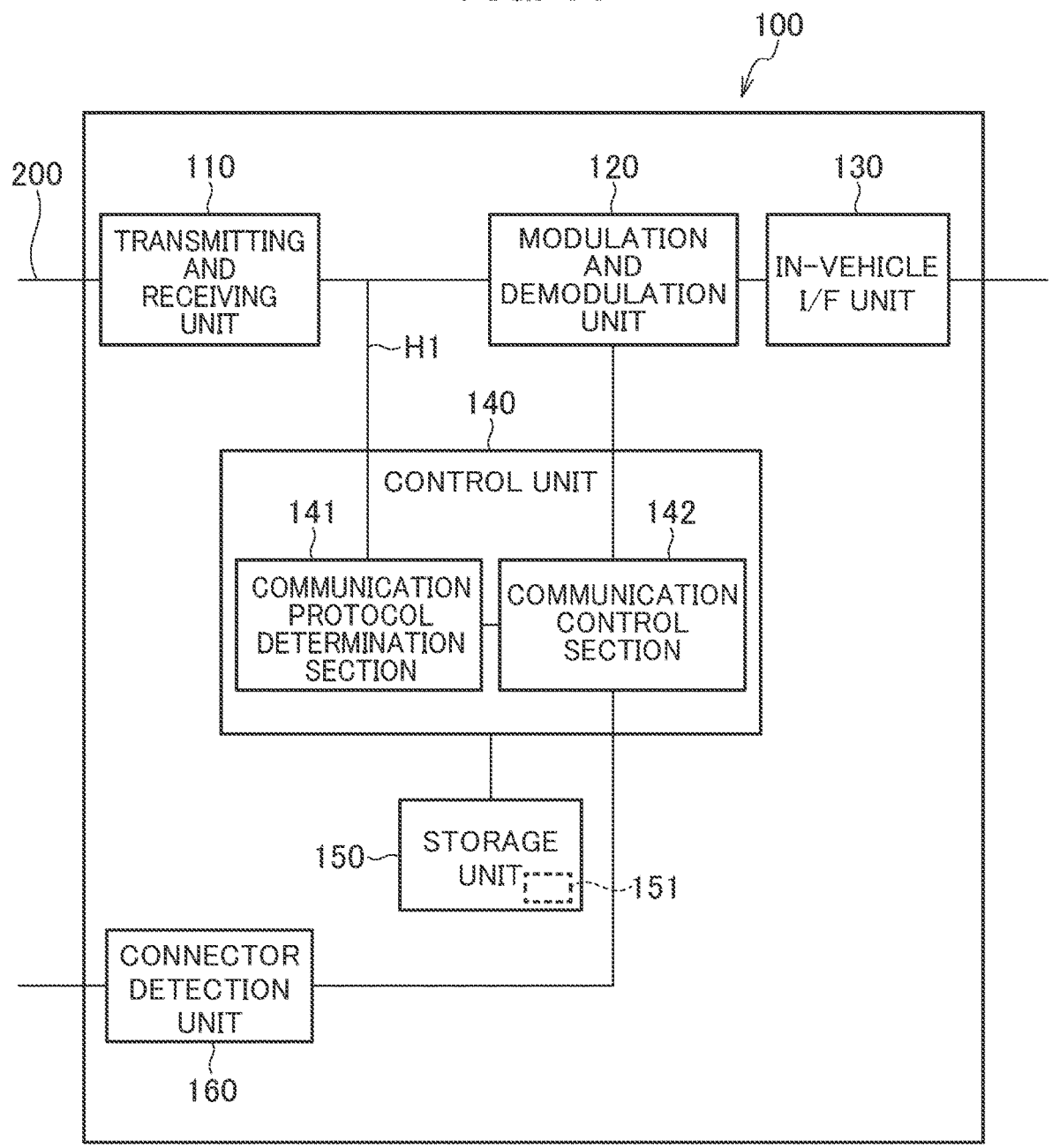
FIG. 10 is a block diagram illustrating an example of another configuration of the information transmitting and receiving device according to the embodiment.

FIG. 10 illustrates a schematic diagram of the first information transmitting and receiving device 100 with an additional configuration for detecting a connection or disconnection between the external connector 300b, which also functions as a power supply connector, and the internal connector 300a in FIGS. 8 and 9.

The first information transmitting and receiving device 100 includes the transmitting and receiving unit 110 connectable to the third transmission line 200, the modulation and demodulation unit 120, the in-vehicle I/F unit 130, the control unit 140, the storage unit 150, and a connector detection unit 160.

The details of the transmitting and receiving unit 110, the modulation and demodulation unit 120, the in-vehicle I/F unit 130, the control unit 140, and the storage unit 150 are omitted because they are described in FIG. 7.

The connector detection unit 160 has a function of determining whether or not a signal transmitted through the second transmission line 410 is disconnected at the part where the internal connector 300a and the external connector 300b are connected. For example, a detection terminal connected to a ground or a predetermined voltage, is provided in the external connector 300b. Then, a conductive socket connected to the detection terminal, is provided in the external connector 300b. Under the configuration, a signal corresponding to the ground or the predetermined voltage from the socket is connected to an input of the connector detection unit 160 by a conductor. It is noted that a pull-up resistor or a pull-down resistor is connected to the input of the connector detection unit 160. The connector detection unit 160 is configured to detect that the internal connector 300a and the external connector 300b are disconnected before the signal to be transmitted to the transmitting and receiving unit 110 is disconnected. For example, the connector detection unit 160 is configured such that the connection between the detection terminal and the socket is disconnected before the signal transmitted through the second transmission line 410 is disconnected.

The connector detection unit 160 may have the following configuration to determine whether or not the signal transmitted through the second transmission line 410 is disconnected at the part where the internal connector 300a and the external connector 300b are connected. For example, at a time point when an energy is no longer supplied from the energy supply transmission line 420 connected to the external connector 300b, energy unsupply information may be transmitted from the energy supply facility 500 to the connector detection unit 160 using an energy supply information transmission line (not illustrated). The energy supply information transmission line is included in the hybrid cable 400 and connected to the connector detection unit 160 via the external connector 300b and the internal connector 300a. When the connector detection unit 160 detects that the internal connector 300a and the external connector 300b are connected as described above, the following processing may be performed with respect to the signal transmitted through the second transmission line 410. That is, it is also possible for the communication protocol determination section 141 to analyze the protocol of the transmission and reception signal H1 transferred between the transmitting and receiving unit 110 and the modulation and demodulation unit 120.

As described above, it is possible to provide the moving body-mounted communication system that can transmit a large amount of data at a higher speed than before by using communication in which a converter having a protocol conversion or a media conversion is not included between the moving body-mounted communication network and the outside thereof.

The features of the moving body-mounted communication system 1000 and the communication system 2000 will be described below.

The moving body-mounted communication system 1000 according to a first aspect includes the internal connector 300a mounted on the moving body 10 and connected to the external connector 300b which is connected to the second transmission line 410. Information is transferred in the first transmission line 600 used in the information and communication network 700 outside the moving body 10. The information is transferred between the first transmission line 600 and the second transmission line 410 without performing conversion of an information form of the information between light and electricity. The moving body-mounted communication system 1000 includes the third transmission line 200 arranged in the moving body 10 and connected to the internal connector 300a. The information is transferred between the second transmission line 410 and the third transmission line 200 without performing conversion of the information form of the information between light and electricity. The moving body-mounted communication system 1000 includes the first information transmitting and receiving device 100 connected to the third transmission line 200, and transmitting and receiving the information. The first information transmitting and receiving device 100 transmits the information to the information and communication network 700 and receives the information from the information and communication network 700, without performing conversion of the information form of the information between light and electricity. The internal connector 300a is connected to the second transmission line 410 and an energy supply transmission line 420 by which energy for moving the moving body 10 is supplied.

With the above-described configuration, a large amount of data can be downloaded and uploaded faster than before by using communication in which a converter with protocol conversion or media conversion is not used between the moving body-mounted communication network and the outside thereof.

In the moving body-mounted communication system 1000 according to a second aspect, the first information transmitting and receiving device 100 transmits the information to the information and communication network 700 and receives the information from the information and communication network 700, without performing at least one of a modulation process and a demodulation process of the information form.

With the above-described configuration, data delays can be reduced more than before by using communication in which at least one of a modulation process and a demodulation process of a signal is not performed between the moving body-mounted communication network and the outside thereof.

In the moving body-mounted communication system 1000 according to a third aspect, each of the first transmission line 600, the second transmission line 410 and the third transmission line 200 is an optical fiber, and the information form is an optical signal.

With the above-described configuration, a large amount of data can be downloaded and uploaded faster than before by using communication in which a converter with protocol conversion or media conversion is not used between the moving body-mounted communication network and the outside thereof.

In the moving body-mounted communication system 1000 according to a fourth aspect, a single-mode optical fiber is used in a part of the first transmission line 600 (first transmission line 600a) connected to the second transmission line 410. Each of the second transmission line 410 and the third transmission line 200 is a single-mode optical fiber or a multimode optical fiber.

With the above-described configuration, the use of optical communication in which the single-mode optical fiber is used to connect the moving body-mounted communication system and an optical communication system outside of the moving body-mounted communication system, enables high-speed communication with a simple configuration. In addition, if the multimode optical fibers is used as the second transmission line 410 and the third transmission line 200, it will be possible to realize low-cost and highly flexible wiring that is resistant to bending of the communication path.

In the moving body-mounted communication system 1000 according to a fifth aspect, the internal connector 300a is connected to a plurality of third transmission lines 200a, 200b and 200c. One of the third transmission lines 200a, 200b and 200c connected to the internal connector 300a is connected to one of the first information transmitting and receiving devices 100a, 100b and 100c.

With the above-described configuration, a large amount of data can be downloaded and uploaded faster than before by using communication in which a converter with protocol conversion or media conversion is not used between the moving body-mounted communication network and the outside thereof.

In the moving body-mounted communication system 1000 according to a sixth aspect, the internal connector 300a is connected to the third transmission line 200 via the optical branching device 210 a. The third transmission line 200 connected to the optical branching device 210a is directly connected to the first information transmitting and receiving device 100 or is connected to the first information transmitting and receiving device 100 via another optical branching device 210b or another optical branching devices 210b and 210c.

With the above-described configuration, a large amount of data can be downloaded and uploaded faster than before by using communication in which a converter with protocol conversion or media conversion is not used between the moving body-mounted communication network and the outside thereof.

The moving body-mounted communication system 1000 according to a seventh aspect, further includes the second information transmitting and receiving device 230 connected to the first information transmitting and receiving device 100 via an optical fiber or a metal cable. The first information transmitting and receiving device 100 includes the data buffer section 151 when a communication speed between the first information transmitting and receiving device 100 and the second information transmitting and receiving device 230 is lower than a communication speed between the first information transmitting and receiving device 100 and the third transmission line 200. The data buffer section 151 has a function to buffer data. for communication between the first information transmitting and receiving device 100 and the second information transmitting and receiving device 230.

With the above-described configuration, even if a low-speed communication path exists in the moving body-mounted communication system 1000, high-speed download and upload with an optical communication system outside of the moving body-mounted communication system 1000 can be realized by including the data buffer section 151 in a high-speed communication path which is equivalent to a communication speed of the optical communication system.

The communication system 2000 according to an eighth aspect includes the moving body-mounted communication system according to any one of the first to seventh aspects and the external connector 300b. The communication system 2000 includes the hybrid cable 400 connected to the external connector 300b and including therein the second transmission line 410 and the energy supply transmission line 420.

With the above-described configuration, a large amount of data can be downloaded and uploaded faster than before by using communication in which a converter with protocol conversion or media conversion is not used between the moving body-mounted communication network and the outside thereof. If the energy supply transmission line 420 is a refueling tube or a power cable and the second transmission line 410 is an optical fiber, the possibility of interference being induced in an optical signal transferring information in the hybrid cable 400 is reduced, thus enabling high-speed communication.

The communication system according to a ninth aspect, further includes the energy supply facility 500 supplying energy to the energy supply transmission line 420. The energy supply facility 500 includes a connection portion which connects the first transmission line 600 to the second transmission line 410, and the connection portion includes the receiving optical amplifier 511 and the transmitting optical amplifier 512.

With the above-described aspect, when receiving an energy supply from an energy supply facility 500, such as a charging station or a refueling station, the mobile body 10 is sure to stop, making it possible to download and upload a large amount of data at high speed by wired communication rather than wireless communication. In addition, by including an optical amplifier in the energy supply facility 500, it is possible to reduce the error rate of the signal even when the optical signal is transmitted from a long distance, thus enabling high-speed communication with a reduced number of retransmissions.

In the communication system according to a tenth aspect, the moving body 10 uses electric power as energy, and the energy supply transmission line 420 is a power cable.

With the above-described aspect, since the information transferred in the optical fiber cable is indicated by an optical signal, even if the optical fiber cable is hybridized with the power cable, the optical signal is not interfered with by the power cable, making it possible to transfer information at high speed and accurately.

The embodiments have been described in detail with reference to the drawings, but the present invention is not limited by the contents described in the above embodiments. The components described above include those that can be easily assumed by those skilled in the art and those that are substantially the same. Furthermore, the configurations described above can be combined as appropriate. In addition, various omissions, substitutions, or changes in the configuration may be made without departing from the gist of the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A moving body-mounted communication system comprising:
    an internal connector mounted on a moving body and connected to an external connector which is connected to a second transmission line,
        wherein information is transferred in a first transmission line used in an information and communication network outside the moving body, and the information is transferred between the first transmission line and the second transmission line without performing conversion of an information form of the information between light and electricity;
    a third transmission line arranged in the moving body and connected to the internal connector,
        wherein the information is transferred between the second transmission line and the third transmission line without performing conversion of the information form of the information between light and electricity; and
    a first information transmitting and receiving device connected to the third transmission line, and transmitting and receiving the information transferred in the third transmission line,
    wherein the first information transmitting and receiving device transmits the information to the information and communication network and receives the information from the information and communication network, without performing conversion of the information form of the information between light and electricity, and the internal connector is connected to the second transmission line and an energy supply transmission line by which energy for moving the moving body is supplied and
    wherein the first information transmitting and receiving device transmits the information to the information and communication network and receives the information from the information and communication network, without performing at least one of a modulation process and a demodulation process of the information form.

2. The moving body-mounted communication system according to claim 1, wherein
    each of the first transmission line, the second transmission line and the third transmission line is an optical fiber, and
    the information form is an optical signal.

3. The moving body-mounted communication system according to claim 2, wherein
    a single-mode optical fiber is used in a part of the first transmission line connected to the second transmission line, and
    each of the second transmission line and the third transmission line is a single-mode optical fiber or a multi-mode optical fiber.

4. The moving body-mounted communication system according to claim 1, wherein
    the internal connector is connected to a plurality of third transmission lines, and
    one of the third transmission lines connected to the internal connector is connected to one first information transmitting and receiving device.

5. The moving body-mounted communication system according to claim 2, wherein
    the internal connector is connected to the third transmission line via an optical branching device, and
    the third transmission line connected to the optical branching device is directly connected to the first information transmitting and receiving device or is connected to the first information transmitting and receiving device via another optical branching device.

6. The moving body-mounted communication system according to claim 1, further comprising a second information transmitting and receiving device connected to the first information transmitting and receiving device via an optical fiber or a metal cable,
    wherein the first information transmitting and receiving device includes a data buffer section for communication with the second information transmitting and receiving device when a communication speed between the first information transmitting and receiving device and the second information transmitting and receiving device is lower than a communication speed between the first information transmitting and receiving device and the third transmission line.

7. A communication system comprising:
a moving body-mounted communication system including an internal connector mounted on a moving body;
an external connector connected to the internal connector; and
a hybrid cable connected to the external connector and including therein a second transmission line and an energy supply transmission line by which energy for moving the moving body is supplied,
wherein
the moving body-mounted communication system further including:
   a third transmission line arranged in the moving body and connected to the internal connector, and
   a first information transmitting and receiving device connected to the third transmission line, and transmitting and receiving the information transferred in the third transmission line,
information is transferred in a first transmission line used in an information and communication network outside the moving body,
the information is transferred between the first transmission line and the second transmission line without performing conversion of an information form of the information between light and electricity,
the information is transferred between the second transmission line and the third transmission line without performing conversion of the information form of the information between light and electricity, and
the first information transmitting and receiving device transmits the information to the information and communication network and receives the information from the information and communication network, without performing conversion of the information form of the information between light and electricity.

8. A communication system comprising:
a moving body-mounted communication system including an internal connector mounted on a moving body;
an external connector connected to the internal connector; and
a hybrid cable connected to the external connector and including therein a second transmission line and an energy supply transmission line by which energy for moving the moving body is supplied,
wherein the moving body-mounted communication system further including:
   a third transmission line arranged in the moving body and connected to the internal connector, and
   a first information transmitting and receiving device connected to the third transmission line, and transmitting and receiving the information transferred in the third transmission line,
information is transferred in a first transmission line used in an information and communication network outside the moving body,
the information is transferred between the first transmission line and the second transmission line without performing conversion of an information form of the information between light and electricity, the information is transferred between the second transmission line and the third transmission line without performing conversion of the information form of the information between light and electricity, and the first information transmitting and receiving device transmits the information to the information and communication network and receives the information from the information and communication network, without performing conversion of the information form of the information between light and electricity and
wherein the first information transmitting and receiving device transmits the information to the information and communication network and receives the information from the information and communication network, without performing at least one of a modulation process and a demodulation process of the information form.

9. The communication system according to claim 7, wherein
the moving body uses electric power as energy, and
the energy supply transmission line is a power cable.

* * * * *